(12) United States Patent
Becker

(10) Patent No.: US 9,429,242 B2
(45) Date of Patent: Aug. 30, 2016

(54) DUAL POPPET PROPORTIONAL SOLENOID CONTROL VALVE

(71) Applicant: Schaeffler Technologies GmbH & Co. KG, Herzogenaurach (DE)

(72) Inventor: David Becker, Walled Lake, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 178 days.

(21) Appl. No.: 14/224,612

(22) Filed: Mar. 25, 2014

(65) Prior Publication Data

US 2014/0311586 A1  Oct. 23, 2014

Related U.S. Application Data

(60) Provisional application No. 61/813,991, filed on Apr. 19, 2013.

(51) Int. Cl.

| | |
|---|---|
| F16K 31/06 | (2006.01) |
| F15B 13/043 | (2006.01) |
| F15B 13/04 | (2006.01) |
| F16K 11/07 | (2006.01) |
| F16K 11/044 | (2006.01) |
| F16K 11/048 | (2006.01) |

(52) U.S. Cl.
CPC .......... *F16K 11/0704* (2013.01); *F16K 11/048* (2013.01); *Y10T 137/0452* (2015.04); *Y10T 137/0502* (2015.04); *Y10T 137/86622* (2015.04); *Y10T 137/86678* (2015.04); *Y10T 137/86686* (2015.04); *Y10T 137/86839* (2015.04); *Y10T 137/87217* (2015.04); *Y10T 137/87241* (2015.04)

(58) Field of Classification Search
CPC ............. F16K 11/0704; F16K 11/048; Y10T 137/0452; Y10T 137/0502; Y10T 137/86839; Y10T 137/86622; Y10T 137/86678; Y10T 137/86686; Y10T 137/87217; Y10T 137/87241
USPC ............ 137/625.65, 625.64, 625.67, 625.68, 137/625.69, 625.26, 625.27, 596.17, 596.2; 73/1.17, 46, 47, 48, 49.7, 49.8
See application file for complete search history.

(56) References Cited

U.S. PATENT DOCUMENTS

| | | | |
|---|---|---|---|
| 4,637,439 A | 1/1987 | Jeans | |
| 5,275,207 A * | 1/1994 | Tonhauser | F02M 37/0023 123/198 DB |
| 5,513,832 A | 5/1996 | Becker et al. | |
| 5,558,125 A * | 9/1996 | Sell | F16K 11/044 137/625.27 |
| 6,322,468 B1 | 11/2001 | Wing et al. | |

* cited by examiner

*Primary Examiner* — Eric Keasel
*Assistant Examiner* — Kelsey Rohman
(74) *Attorney, Agent, or Firm* — Volpe and Koenig, P.C.

(57) ABSTRACT

A control valve for hydraulic media is provided. The control valve includes a valve body having four ports. A first seat, a second seat, and a dual seat are positioned in the valve body between the ports. Two poppets, each including a disc and a cup, with a spring located therebetween, are arranged on a cylindrical pin with an enlarged engagement portion that is slidably supported within the valve body. A solenoid assembly movable in an axial direction within the valve body contacts the cylindrical pin and adjusts the position of the discs and cups of the poppets with respect to the seats of the valve body to minimize unwanted leakage between the ports. This configuration comprises four variable orifices that cooperate to provide controlled flow during different energizing phases of the solenoid assembly.

9 Claims, 12 Drawing Sheets

DUAL POPPET PROPORTIONAL SOLENOID CONTROL VALVE

INCORPORATION BY REFERENCE

The following documents are incorporated herein by reference as if fully set forth: U.S. Provisional Application No. 61/813,991, filed Apr. 19, 2013.

FIELD OF INVENTION

This application is generally related to a control valve and more particularly related to a poppet solenoid control valve.

BACKGROUND

Control valves are widely used in various mechanical applications, including automotive and industrial applications, especially for variable cam timing applications in internal combustion engines. Existing control valves typically require high manufacturing tolerances for the control valve body. High tolerance valve bodies are relatively complicated and consequently are also expensive to manufacture. Known control valves are disclosed in U.S. Pat. No. 4,637,439, U.S. Pat. No. 5,513,832, and U.S. Pat. No. 6,322,468.

Control valves also typically experience leakage between ports due to ineffective sealing. Leakage of hydraulic fluid between ports on a control valve compromises the control function, ultimately reducing the efficiency or operation of the associated engine element.

SUMMARY

It would be desirable to provide a cost effective control valve that allows the use of more relaxed manufacturing tolerances and provides improved sealing against leakage between ports of the valve body.

A control valve for hydraulic media is provided. The control valve includes a valve body defining an axial end port, a first peripheral control port, a second peripheral control port, and a medial peripheral port. A first seat is positioned in the valve body between the axial end port and the first peripheral control port. A dual seat surrounds the medial peripheral port and is positioned in the valve body between the first peripheral control port and the second peripheral control port. A second seat is positioned in the valve body between the second peripheral control port and a first axial end of the valve body opposite the axial end port. A first poppet, including a first disc, a first cup, and a first spring located therebetween, is positioned between the first seat and the dual seat. A second poppet, including a second disc, a second cup, and a second spring located therebetween, is positioned between the dual seat and the second seat. A cylindrical pin with an enlarged engagement portion is slidably supported within the valve body. A solenoid assembly including a sleeve and an armature movable in an axial direction with the armature contacts a first end of the cylindrical pin. A retainer biased by a return spring acts on a second end of the cylindrical pin. The first poppet is located on the cylindrical pin for sliding movement between the enlarged engagement portion and the retainer. The second poppet is located on the cylindrical pin for sliding movement between the enlarged engagement portion and the sleeve. The first and second poppets are pressed closed and the first peripheral control port is in fluid connection with the axial end port and the medial peripheral port is in fluid connection with the second peripheral control port when the solenoid assembly is in a deactivated state. The armature presses the cylindrical pin against the retainer when the solenoid assembly is actuated in a first state such that the first peripheral control port is isolated from fluid connection by the first disc contacting the first seat and the first cup contacting the dual seat, and the second peripheral control port is isolated from fluid connection by the second disc contacting the dual seat and the second cup contacting the second seat. The sleeve engages the second cup when the solenoid assembly is actuated in a second state, such that the second peripheral control port is in fluid connection with the axial end port, preferably via a passage through the cylindrical pin, and the medial peripheral port is in fluid communication with the first peripheral port.

A method for assembling a control valve for hydraulic media is also provided. The method comprises providing a valve body including a housing, an axial end port, a first peripheral control port, a second peripheral control port, and a medial peripheral port. A first seat is inserted into the valve body from a first axial end of the valve body past the first peripheral control port, and the first seat is fixed within the valve body. A return spring, a retainer, a first poppet, and a dual seat are inserted from the first axial end of the valve body, such that a first end of the return spring engages a second axial end of the valve body and the retainer engages a second end of the return spring. The first poppet includes a first disc, a first cup, and a first spring located therebetween. A dual seat is fixed in position in the valve body such that the dual seat surrounds the medial peripheral port. The first spring biases the first disc against the first seat and biases the first cup against one side of the dual seat. A cylindrical pin with an enlarged engagement portion, a second poppet, and a second seat are inserted from the first axial end of the valve body. The second poppet includes a second disc, a second cup, and a second spring located therebetween that biases the second disc against a second side of the dual seat and biases the second cup against the second seat. The cylindrical pin extends through the first and second poppets. A solenoid assembly is inserted from the first axial end of the valve body, and the housing is closed at the second axial end of the valve body to seal the valve body.

A method for calibrating a control valve for hydraulic media is also provided. The method comprises providing a valve body defining an axial end port, a first peripheral control port, a second peripheral control port, and a medial peripheral port. A first seat is positioned in the valve body between the axial end port and the first peripheral control port. A dual seat surrounds the medial peripheral port and is positioned in the valve body between the first peripheral control port and second peripheral control port. A second seat is positioned in the valve body between the second peripheral control port and an axial end of the valve body opposite the axial end port. A first poppet, including a first disc, a first cup, and a first spring located therebetween, is positioned between the first seat and the dual seat. A second poppet, including a second disc, a second cup, and a second spring located therebetween, is positioned between the dual seat and the second seat. A cylindrical pin with an enlarged engagement portion is slidably supported within the valve body and extends through the first and second poppets. Leakage of hydraulic media is detected between the axial end port, the first peripheral control port, the second peripheral control port, and the medial peripheral port based on a position of the first and second poppets. The position of the first seat, the dual seat, or the second seat is adjusted in the valve body based on the leakage that is detected in order to provide flow paths that are connected to or sealed from one another depending on a position of the cylindrical pin.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
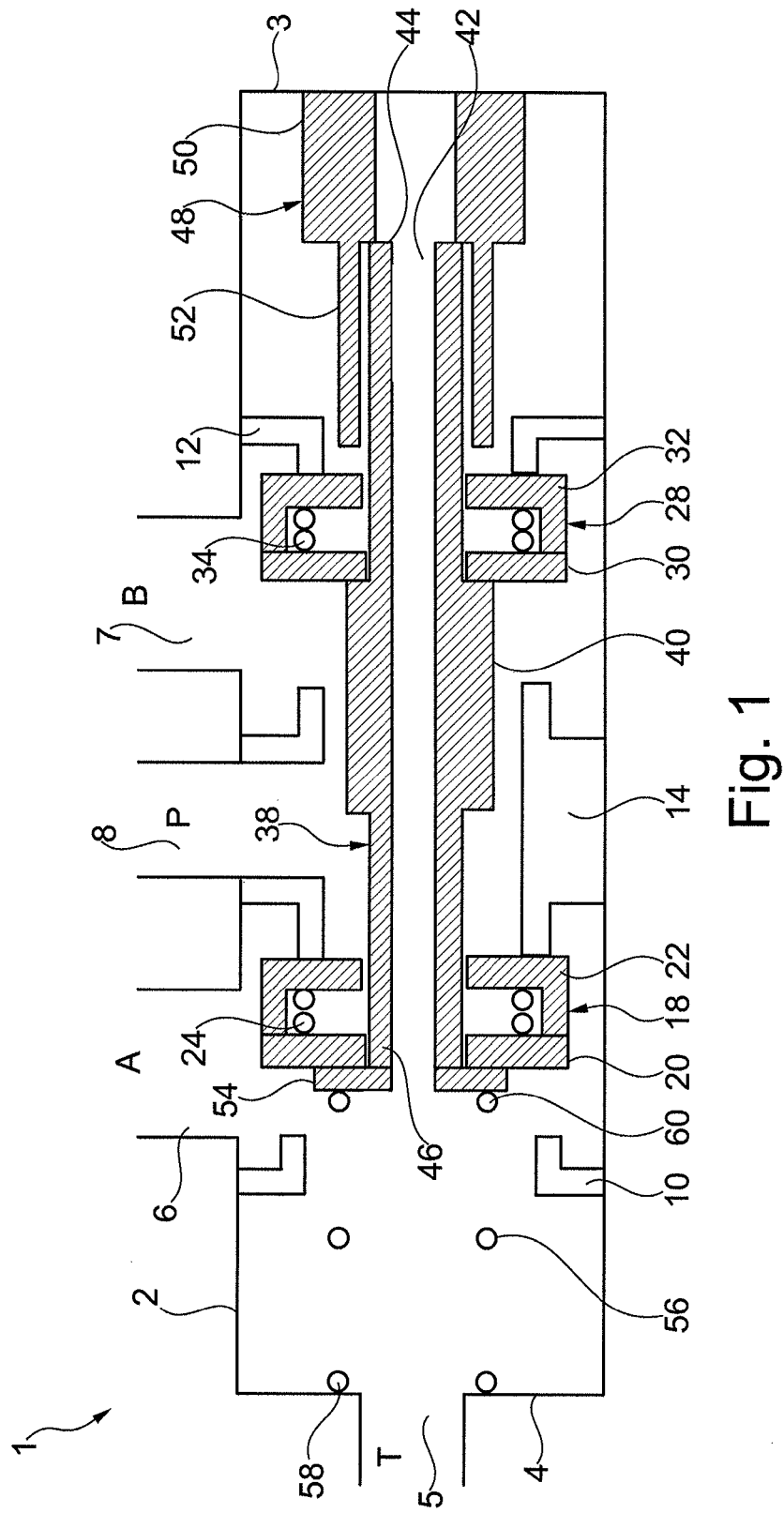
FIG. 1 is a schematic side view of a control valve according to the invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

FIG. 1 schematically shows a preferred embodiment of the control valve 1 according to the present invention. In the example embodiment shown, the control valve 1 includes a valve body 2 defining an axial end port 5, a first peripheral control port 6, a second peripheral control port 7, and a medial peripheral port 8. The valve body 2 may be formed from steel, aluminum, polymeric material, or any other suitable material. The axial end port 5 may be a tank port and the medial peripheral port 8 may be a supply pressure port. Alternatively, the medial peripheral port 8 may be the tank port and the axial end port 5 may be the supply pressure port.

A first seat 10 is positioned in the valve body 2 between the axial end port 5 and the first peripheral control port 6. A dual seat 14 surrounds the medial peripheral port 8 and is positioned in the valve body 2 between the first peripheral control port 6 and the second peripheral control port 7. A second seat 12 is positioned in the valve body 2 between the second peripheral control port 7 and a first axial end 3 of the valve body 2 opposite the axial end port 5. The seats may be formed from steel, aluminum, polymeric material, or any other suitable material. The dual seat 14 can be formed integral with the valve body 2 if polymeric material is used for the seats and the valve body 2.

A first poppet 18 is positioned between the first seat 10 and the dual seat 14. The first poppet 18 includes a first disc 20, a first cup 22, and a first spring 24 located therebetween. The first spring 24 biases the first disc 20 against the first seat 10 and the first cup 22 against a first side of the dual seat 14. The first peripheral control port 6 is sealed from supply pressure when the first disc 20 engages the first seat 10 and the first cup 22 engages the first side of the dual seat 14.

A second poppet 28 is positioned between the dual seat 14 and the second seat 12. The second poppet 28 includes a second disc 30, a second cup 32, and a second spring 34 located therebetween. The second spring 34 biases the second disc 30 against a second side of the dual seat 14 and the second cup 32 against the second seat 12. The second peripheral control port 7 is sealed from draining to the tank reservoir when the second disc 30 engages the second side of the dual seat 14 and the second cup 32 engages the second seat 12.

The sealing properties between the cups 22, 32 and the discs 20, 30 of the first and second poppets 18, 28 can be adjusted based on the material of these components. Material selection for these components can be optimized based on plastic or elastic deformation characteristics as desired for durability or leakage considerations.

A cylindrical pin 38 with an enlarged engagement portion 40 is slidably supported within the valve body 2. The cylindrical pin 38 may include a hollow center 42 which allows hydraulic media to flow between the second peripheral control port 7 and the axial end port 5. A solenoid assembly 48 including a sleeve 52 and an armature 50 is movable in an axial direction with the armature 50 contacting a first end of the cylindrical pin 44.

A retainer 54 and a return spring 56 act on a second end 46 of the cylindrical pin 38. The first poppet 18 is located on the cylindrical pin 38 for sliding movement between the enlarged engagement portion 40 and the retainer 54. The second poppet 28 is located on the cylindrical pin 38 for sliding movement between the enlarged engagement portion 40 and the sleeve 52. The first and second poppets 18, 28 are pressed closed by the return spring 56 acting on the retainer 54 and the enlarged engagement portion 40 acting on the second disc 30, and the first peripheral control port 6 is in fluid connection with the axial end port 5 and the medial peripheral port 8 is in fluid connection with the second peripheral control port 7 when the solenoid assembly 48 is in a deactivated state. The solenoid assembly 48 may be a push or pull type such that the first and second poppets 18, 28 may be pressed closed in an activated or deactivated state. In the push type, the deactivated state corresponds to a "base state" in which a solenoid coil (not shown) is de-energized. The stiffness of the first spring 24, the second spring 34, and the return spring 56 may be adjusted depending on the amount of pressure forces exerted by hydraulic media in various applications.

The armature 50 presses the cylindrical pin 38 against the retainer 54 when the solenoid assembly 48 is actuated in a first state such that the first peripheral control port 6 is isolated from fluid connection by the first disc 20 contacting the first seat 10 and the first cup 22 contacting the first side of the dual seat 14, and the second peripheral control port 7 is isolated from fluid connection by the second disc 30 contacting the second side of the dual seat 14 and the second cup 32 contacting the second seat 12. The first state corresponds to a "mid state" in which the solenoid coil is approximately 50% energized.

Figure 2A:
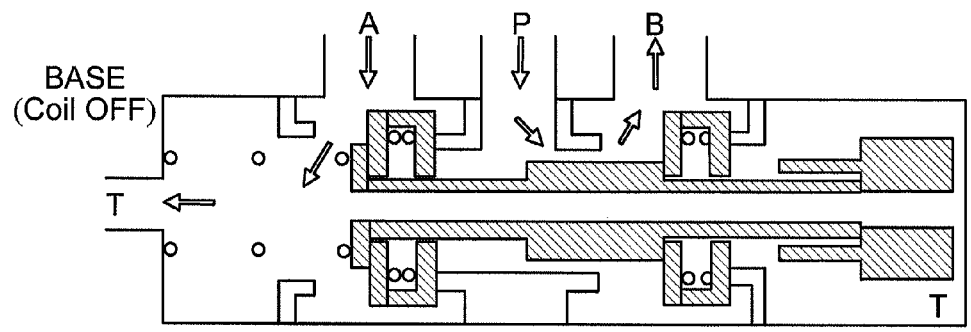
FIGS. 2A-2C are schematic side views of a control valve with a tank port on an axial end of a valve body according to the invention with a solenoid assembly in different states.
Figure 2B:
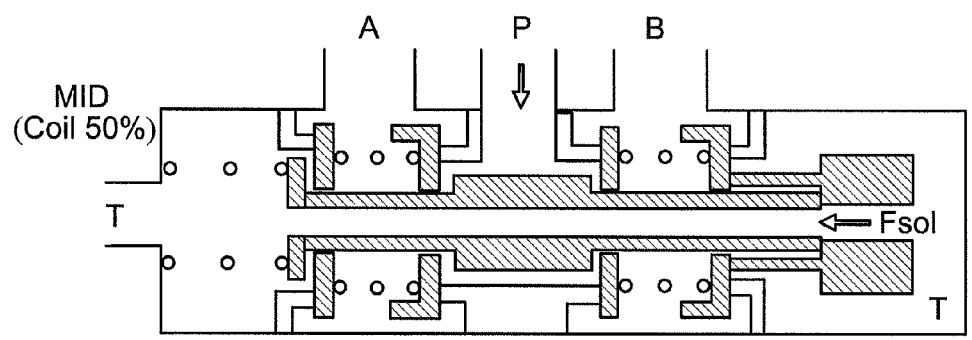
Figure 2C:
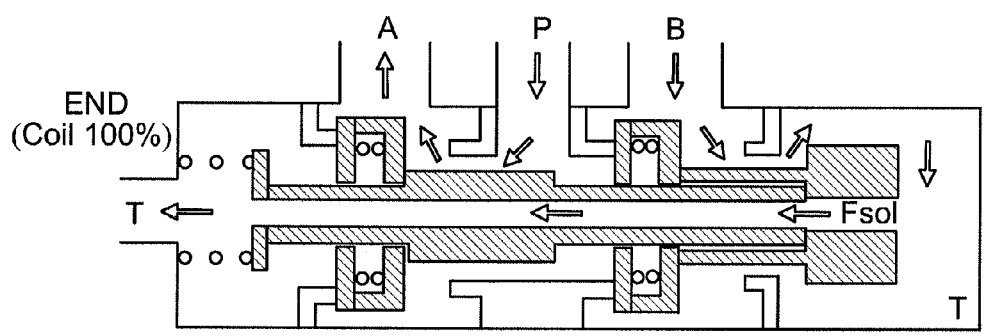
Figure 3A:
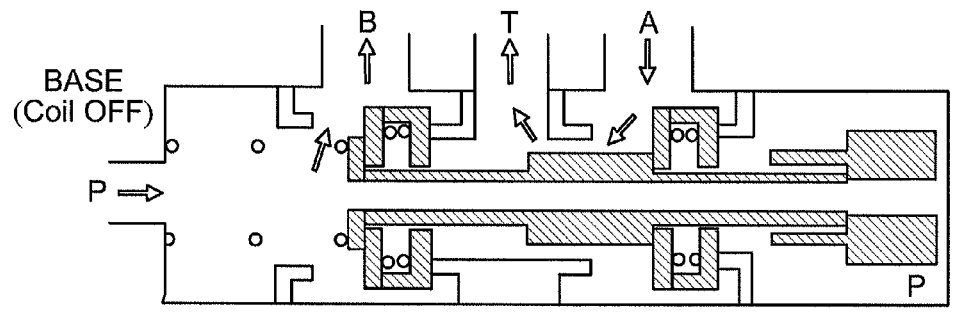
FIGS. 3A-3C are schematic side views of a control valve according to the invention with a supply pressure port on an axial end of a valve body with a solenoid assembly in different states.
Figure 3B:
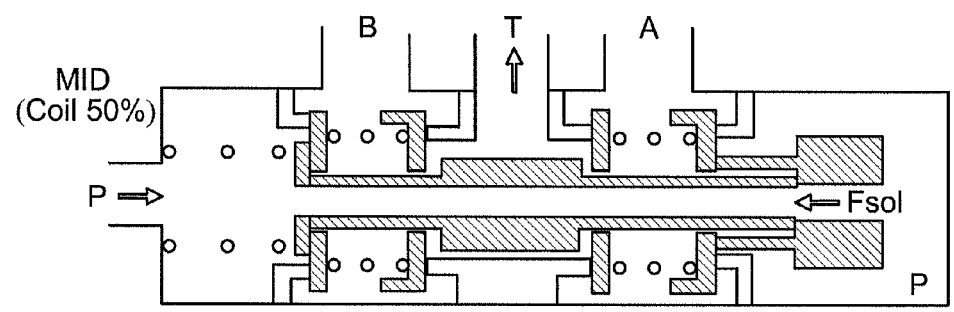
Figure 3C:
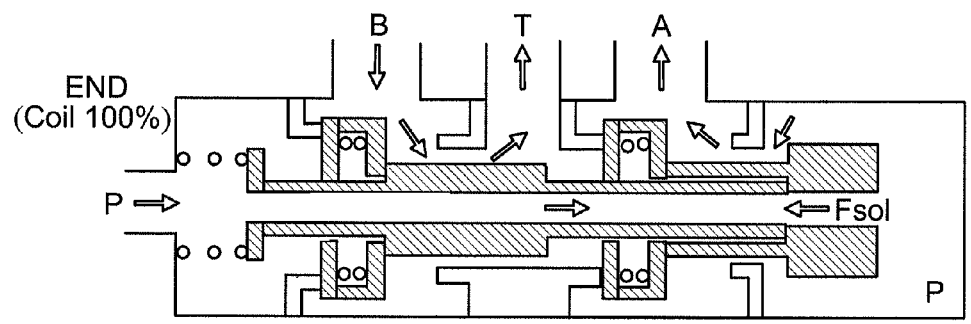

The sleeve 52 engages the second cup 32 when the solenoid assembly 48 is actuated in a second state, such that the second peripheral control port 7 is in fluid connection with the axial end port 5, and the medial peripheral port 8 is in fluid communication with the first peripheral control port 6. The second state corresponds to an "end state" in which the solenoid coil is 100% energized. FIGS. 2A-2C show the three states of the solenoid assembly 48 discussed above for a valve body 2 with a tank port at the axial end port 5 of the valve body 2 and a supply pressure port at the medial peripheral port 8. FIGS. 3A-3C show the same three states of the solenoid assembly 48 for a valve body 2 with a supply pressure port at the axial end port 5 of the valve body 2 and a tank port at the medial peripheral port 8.

Figure 4A:
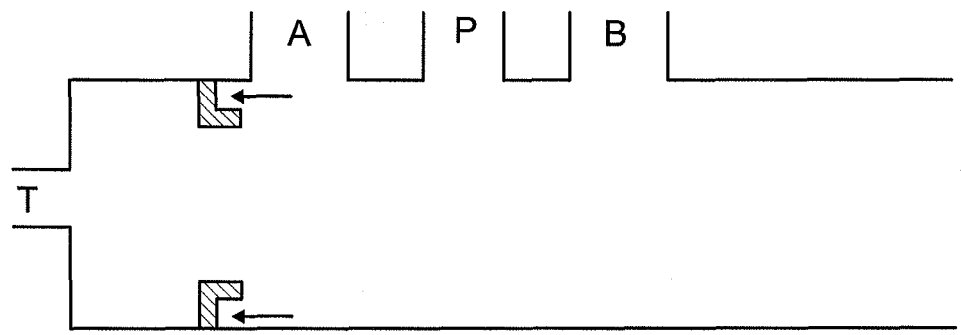
FIGS. 4A-4E are schematic side views of the control valve illustrating an assembly method of the control valve.
Figure 4B:
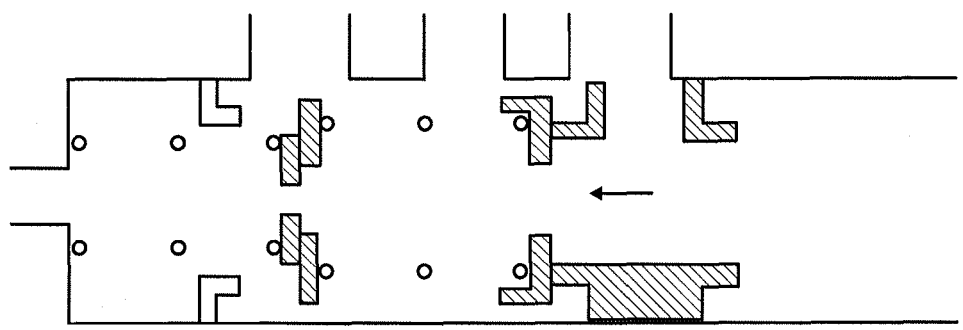
Figure 4C:
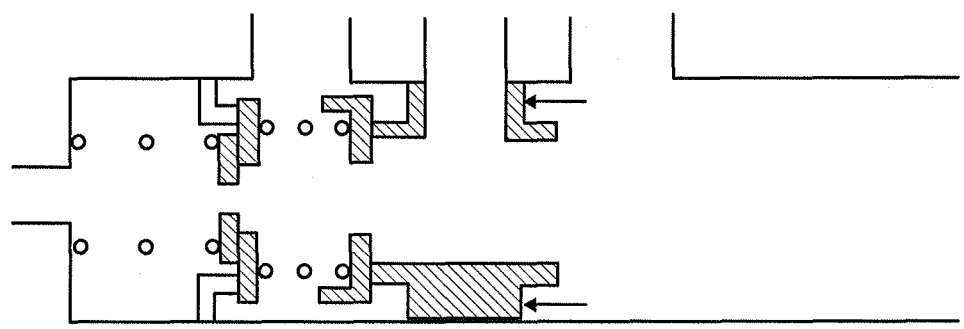
Figure 4D:
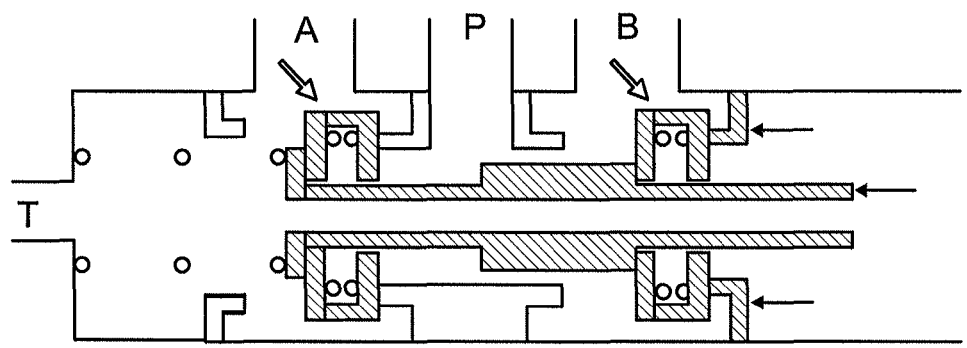
Figure 4E:
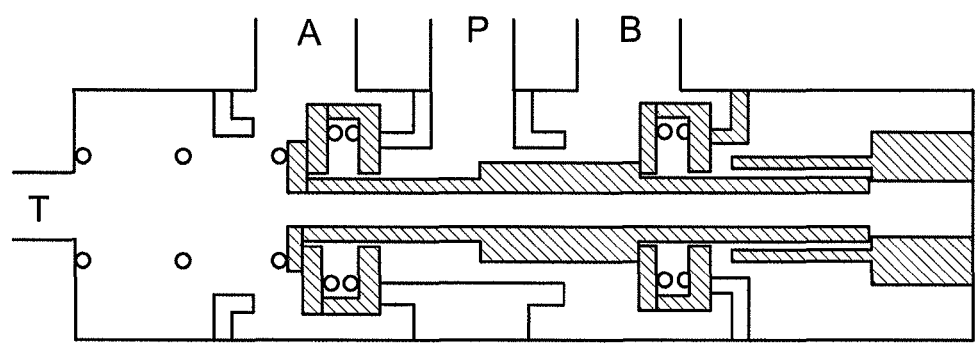

As shown in FIGS. 4A-4E, a method of assembling a control valve 1 for hydraulic media is provided. The method includes providing the valve body 2 including the housing, the axial end port 5, the first peripheral control port 6, the second peripheral control port 7, and the medial peripheral port 8. As shown in FIG. 4A, the first seat 10 is inserted into the valve body 2 from the first axial end 3 of the valve body 2 past the first peripheral control port 6 and the first seat 10 is fixed within the valve body 2. As shown in FIG. 4B, the return spring 56, the retainer 54, the first poppet 18, and the dual seat 14 are inserted from the first axial end 3 of the valve body 2. The first end 58 of the return spring 56 engages the second axial end 4 of the valve body 2 and the retainer 54 engages the second end 60 of the return spring 56. The first poppet 18 includes the first disc 20, the first cup 22, and the first spring 24 located therebetween. As shown in FIG. 4C, the dual seat 14 is fixed in position in the valve body 2 such that the dual seat 14 surrounds the medial peripheral port 8. The first spring 24 biases the first disc 20 against the first seat 10 and biases the first cup 22 against the dual seat 14. As shown in FIG. 4D, the cylindrical pin 38 with the enlarged engagement portion 40, the second poppet 28, and the second seat 12 are inserted into the valve body 2 from the first axial end 3. The second poppet 28 includes the second disc 30, the second cup 32, and the second spring 34 located therebetween that biases the second disc 30 against the dual seat 14 and biases the second cup 32 against the second seat 12. The cylindrical pin 38 extends through the first and second poppets 18, 28. The enlarged engagement portion 40 may slidably engage the first cup 22 and the second disc 30. As shown in FIG. 4E, the solenoid assembly 48 is inserted into the valve body 2 from the first axial end 3. The valve body housing is rolled at the first axial end 3 to seal the valve body 2.

Figure 5A:
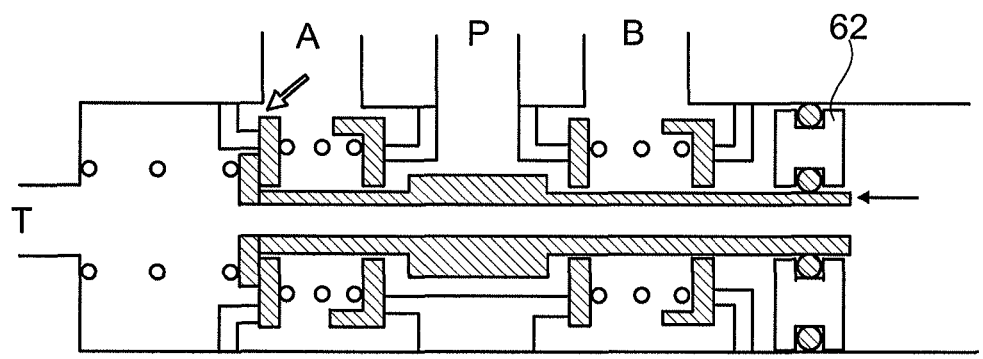
FIGS. 5A-5I are schematic side views of the control valve illustrating a calibrating method of the control valve of FIGS. 4A-4E.

Leakage may occur between ports of the valve body 2 when the solenoid assembly 48 is in the first state and the solenoid assembly 48 and the cylindrical pin 38 are in the mid state. Calibration of the seals between the ports may be performed using hydraulic fluid or air via a pneumatic device. As shown in FIG. 5A, prior to sealing the valve body 2 by rolling the valve body housing at the first axial end 3, an assembly seal aid 62 may be used to test the sealing function of the poppets and the leakage between the ports on the valve body 2. The seal is positioned at the first axial end 3 of the valve body 2 and the cylindrical pin 38 may be adjusted to determine when the first and second poppets 18, 28 properly engage with their respective seats to seal the first and second peripheral control ports 6, 7.

Figure 5B:
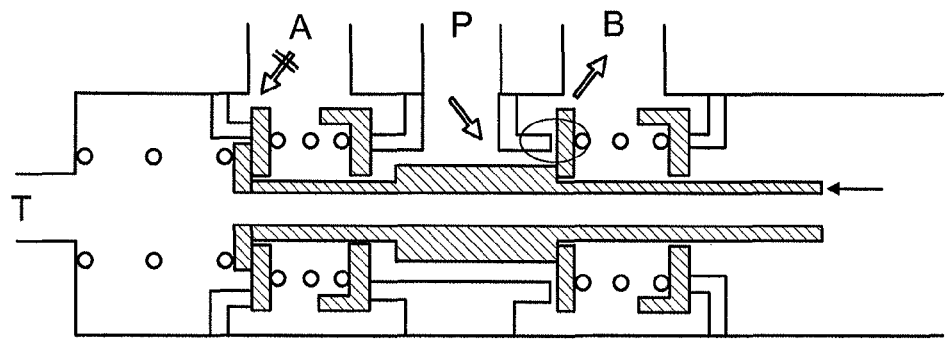
Figure 5C:
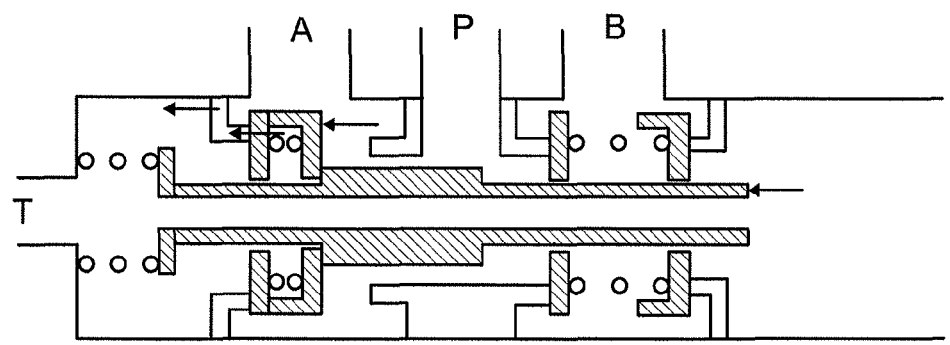

As shown in FIGS. 5B and 5C, if the first seat 10 is positioned too far away from the second axial end 4 of the valve body 2, leakage occurs between the medial peripheral port 8 and the second peripheral control port 7 because the enlarged engagement portion 40 of the cylindrical pin 38 is preventing the second disc 30 from properly engaging with the dual seat 14 and the second poppet 28 cannot seal the second peripheral control port 7. The position of the first seat 10 may be adjusted within the valve body 2 by pressing the cylindrical pin 38 until the enlarged engagement portion 40 engages the first poppet 18, which then moves the first seat 10 in the axial direction towards the second axial end 4 of the valve body 2.

Figure 5D:
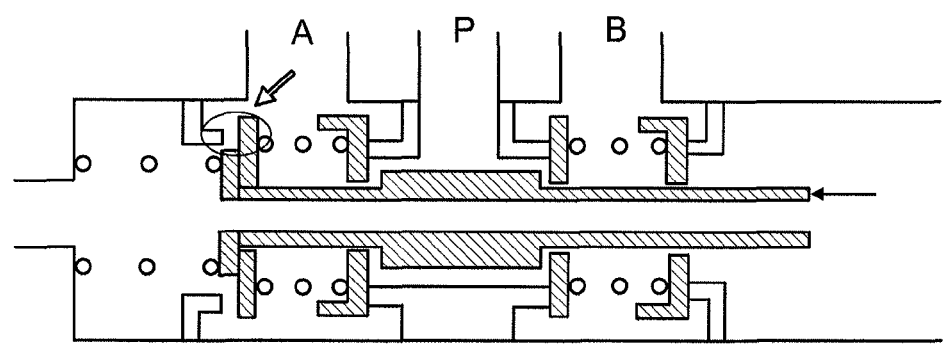
Figure 5E:
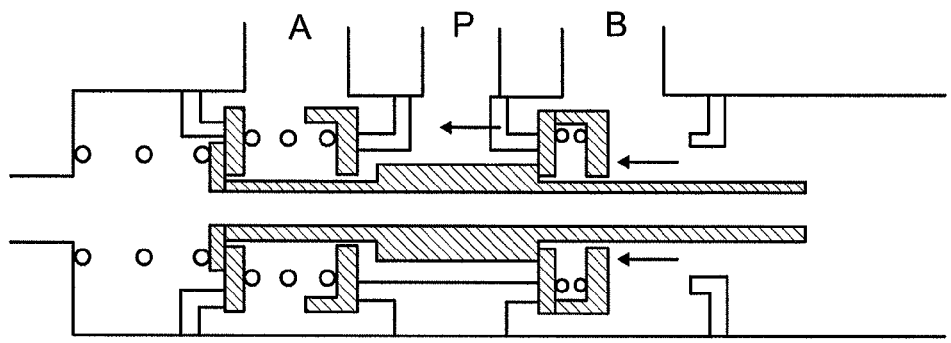

As shown in FIGS. 5D and 5E, if the first seat 10 is positioned too close to the second axial end 4 of the valve body 2, leakage occurs between the first peripheral control port 6 and the axial end port 5 during the first state because the enlarged engagement portion 40 is not engaging the first poppet 18. The first poppet 18 is not properly sealing the first peripheral control port 6 because the first disc 20 is not engaging the first seat 10. The position of the dual seat 14 may be adjusted by pressing the second poppet 28 against the dual seat 14 until the dual seat 14 moves in the axial direction towards the second axial end 4 of the valve body 2.

Figure 5F:
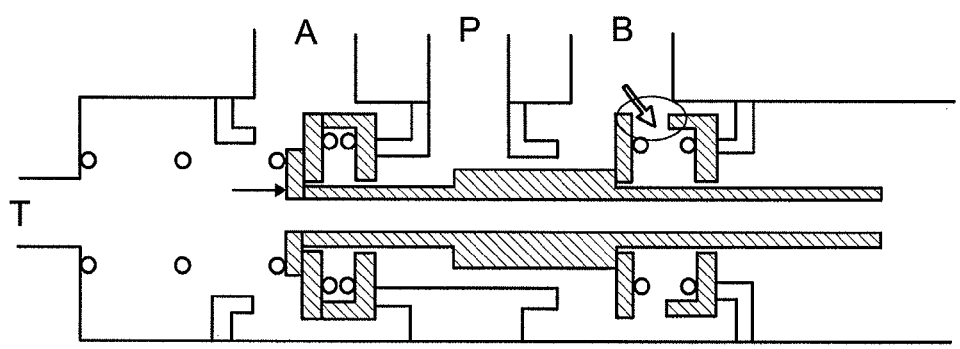
Figure 5G:
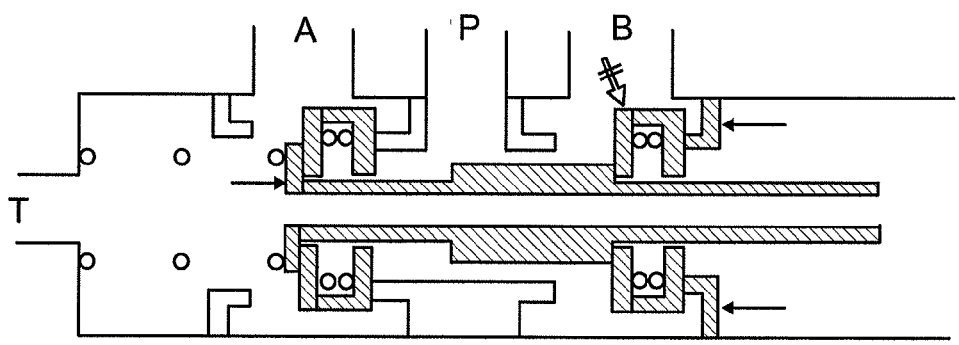

As shown in FIGS. 5F and 5G, if the second seat 12 is positioned too close to the first axial end 3 of the valve body 2, leakage occurs between the second peripheral control port 7 and the axial end port 5 because the second disc 30 is not contacting the second cup 32 and the second poppet 28 is not properly sealing the second peripheral control port 7 from the axial end port 5. The position of the second seat 12 may be adjusted by pressing the second seat 12 deeper into the valve body 2, away from the first axial end 3 of the valve body 2 until the second disc 30 engages the second cup 32 and the second peripheral control port 7 is sealed from the axial end port 5.

Figure 5H:
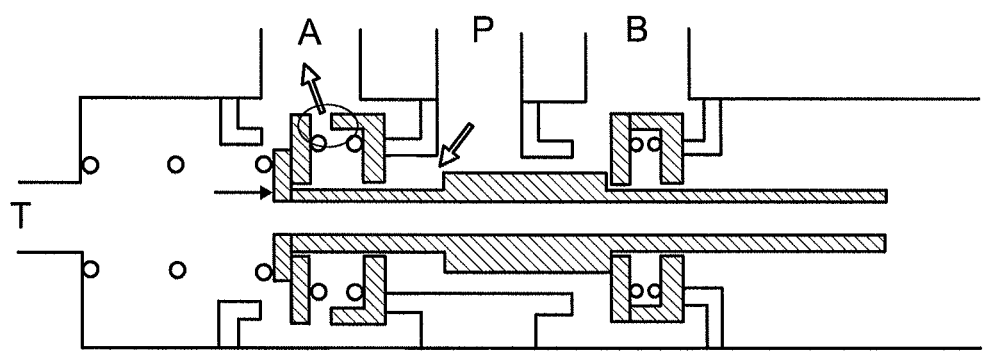
Figure 5I:
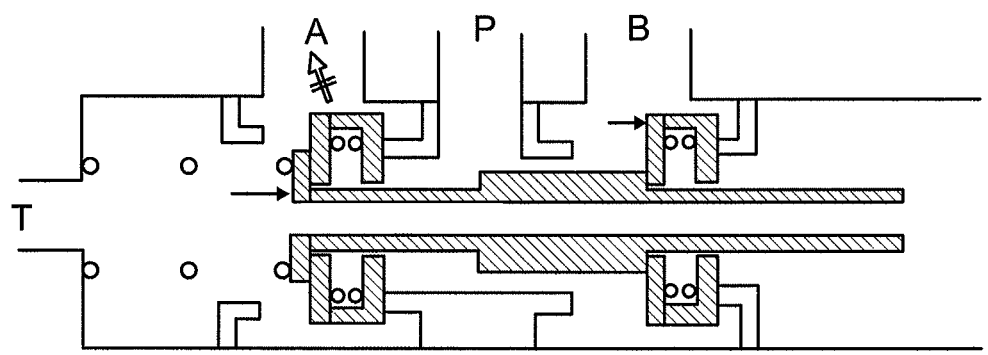

As shown in FIGS. 5H and 5I, if the second seat 12 is positioned too far away from the first axial end 3 of the valve body 2, leakage occurs between the first peripheral control port 6 and the medial peripheral port 8 and/or between the first peripheral control port 6 and the axial end port 5 because the first disc 20 is not contacting the first cup 22 and the first poppet 18 is not properly sealing the first peripheral control port 6. The position of second seat 12 may be adjusted by pulling the cylindrical pin 38 towards the first axial end 3 of the valve body 2 until the enlarged engagement portion 40 of the cylindrical pin 38 engages the second poppet 28 and moves the second seat 12 in the axial direction closer to the first axial end 3 of the valve body 2.

Figure 6A:
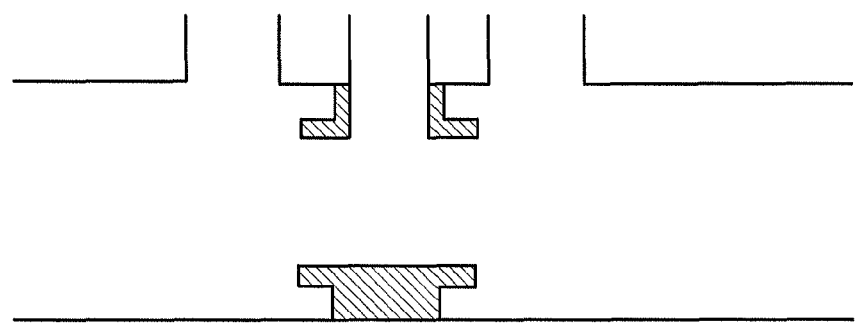
FIGS. 6A-6G are schematic side views of a control valve illustrating another assembly method of a control valve.

In another embodiment, shown in FIGS. 6A-6G, the method of assembling a control valve 1 for hydraulic media includes providing the valve body 2 including open first and second axial ends 3, 4. The valve body 2 includes the housing, the first peripheral control port 6, the second peripheral control port 7, and the medial peripheral port 8. As shown in FIG. 6A, the dual seat 14 may be formed with the valve body 2 or the dual seat 14 may be inserted into the valve body 2 from either the first or second axial end 3, 4 and the dual seat 14 is fixed in position such that the dual seat 14 surrounds the medial peripheral port 8.

Figure 6B:
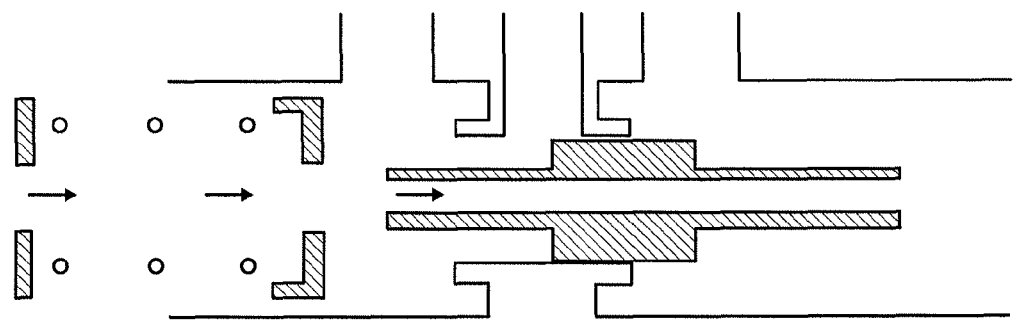
Figure 6C:
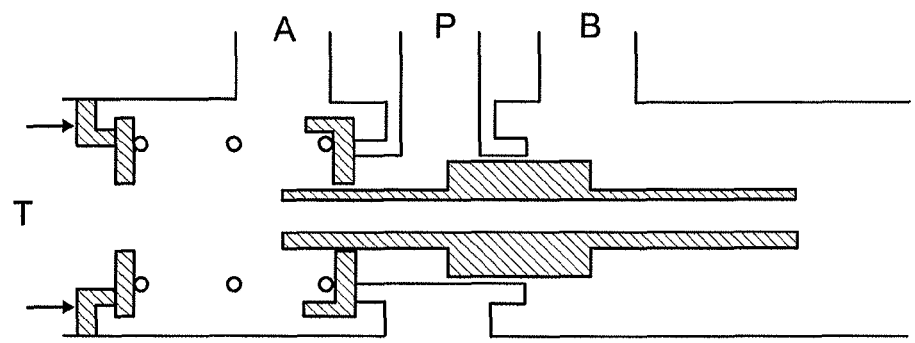

As shown in FIG. 6B, the cylindrical pin 38 with the enlarged engagement portion 40, and the first poppet 18, including the first disc 20, the first cup 22, and the first spring 24 located therebetween, are inserted into the valve body 2 from the second axial end 4. As shown in FIG. 6C, the first seat 10 is inserted into the valve body 2 from the second axial end 4 of the valve body 2 and is fixed within the valve body 2 between the first peripheral control port 6 and the second axial end 4 of the valve body 2. The first spring 24 biases the first disc 20 against the first seat 10 and the first spring 24 biases the first cup 22 against the dual seat 14.

Figure 6D:
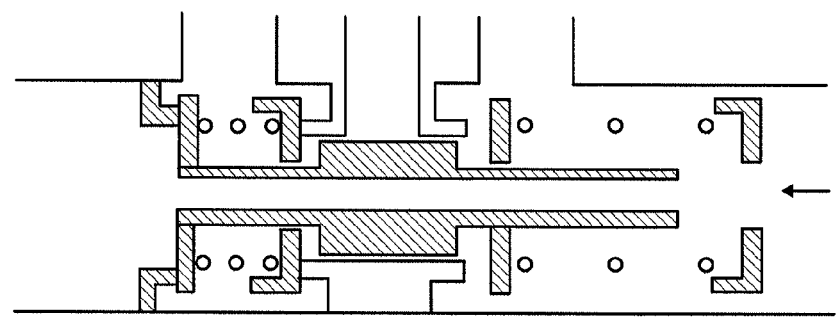
Figure 6E:
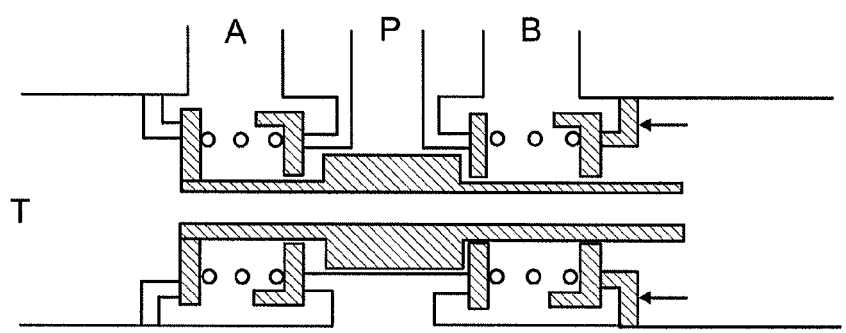

As shown in FIG. 6D, on the opposite side of the dual seat 14, the second poppet 28, including the second disc 30, the second cup 32, and the second spring 34 located therebetween, and the second seat 12 are inserted from the first axial end 3 of the valve body 2. As shown in FIG. 6E, the second seat 12 is fixed within the valve body 2 between the second peripheral control port 7 and the first axial end 3 of the valve body 2. The second spring 34 biases the second disc 30 against the dual seat 14 and the second spring 34 biases the second cup 32 against the second seat 12. The cylindrical pin 38 extends through the first poppet 18 and the second poppet 28 such that the enlarged engagement portion 40 may engage the first cup 22 and the second disc 30.

Figure 6F:
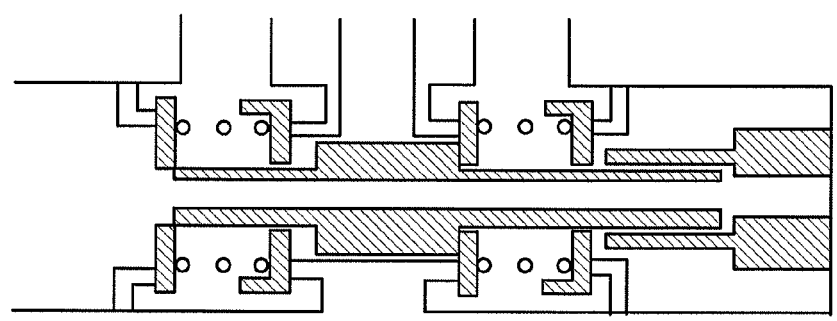

As shown in FIG. 6F, the solenoid assembly 48, including the sleeve 52 and the armature 50 movable in an axial direction, is inserted from the first axial end 3 of the valve body 2. The valve body housing at the first axial end 3 is rolled to seal the valve body 2.

Figure 6G:
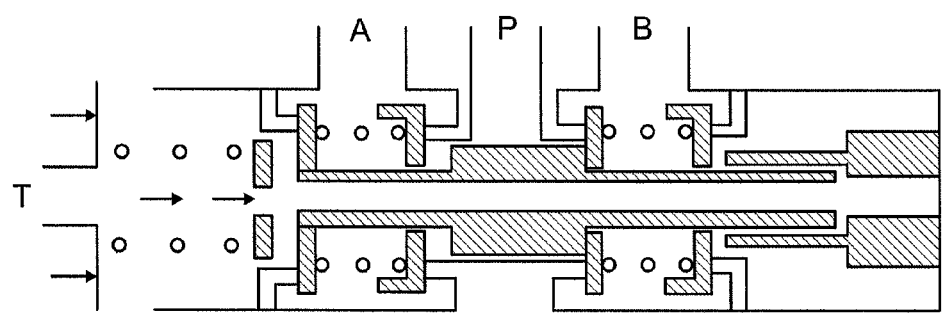

As shown in FIG. 6G, the retainer 54 and the return spring 56, including the first and second end 58, 60, are inserted into the valve body 2 from the second axial end 4 of the valve body 2. The first poppet 18 is located on the cylindrical pin 38 for sliding movement between the enlarged engagement portion 40 and the retainer 54. The second poppet 28 is located on the cylindrical pin 38 for sliding movement between the enlarged engagement portion 40 and the sleeve 52. An end cap defining the axial end port 5 is fixed to the second axial end 4 of the valve. The first end 58 of the return spring 56 engages the end cap, the second end 60 of the return spring 56 engages the retainer 54, and the return spring 56 biases the retainer 54 against the first disc 20. The end cap seals the second axial end 4 of the valve body 2.

Figure 7A:
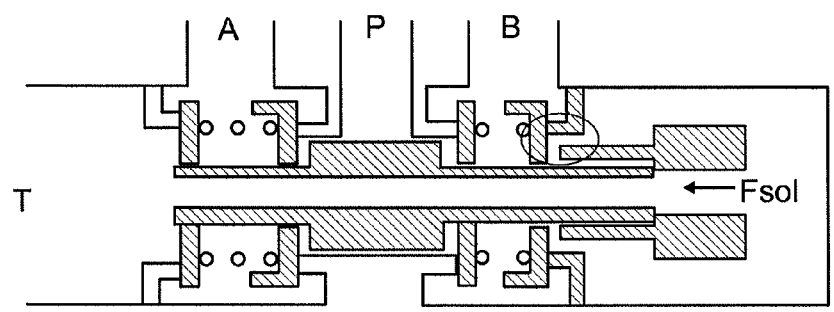
FIGS. 7A-7E are schematic side views of a control valve illustrating a calibrating method of the control valve of FIGS. 6A-6G.
Figure 7B:
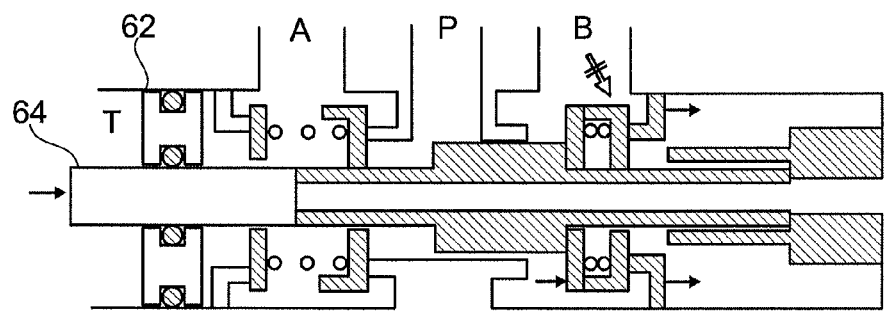

As shown in FIGS. 7A-7E, prior to sealing the second axial end 4 of the valve housing with the end cap, the seal of the first and second poppets 18, 28 may be tested to detect leakage. As shown in FIGS. 7A and 7B, if the second seat 12 is positioned too far away from the first axial end 3 of the valve body 2, the second poppet 28 will not disengage the second seat 12 at the proper time when the solenoid assembly 48 is actuated in the first state. This causes too much space between the sleeve 52 of the solenoid assembly 48 and the second cup 32 and negatively affects the sealing of the poppets. An engagement tool 64 may be used to push the cylindrical pin 38 in the axial direction such that the enlarged engagement portion 40 engages the second poppet 28 and the second poppet 28 pushes the second seat 12 towards the first axial end 3 of the valve body 2. An assembly seal aid 62 surrounding the engagement tool 64 prevents hydraulic media from flowing between the first peripheral control port 6 and the axial end port 5 and allows detection of leakage between the second peripheral control port 7 and the axial end port 5 during calibration.

Figure 7C:
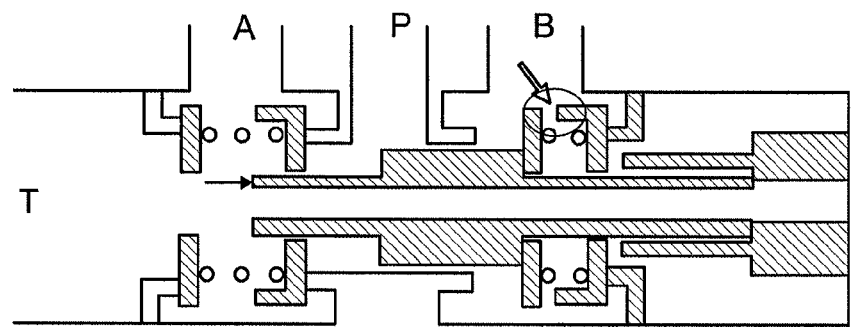

As shown in FIG. 7C, if the second seat 12 is too close to the first axial end 3 of the valve body 2, it is pressed in the opposite direction until the second disc 30 engages the second cup 32 and leakage between the second peripheral control port 7 and the axial end port 5 is minimized. The relatively high contact area at the interface of the second cup 32 and the second disc 30 provides a low leakage seal compared to parallel leak paths between the cylindrical pin 38 and the solenoid assembly 48, and between the solenoid assembly 48 and the valve body 2.

Figure 7D:
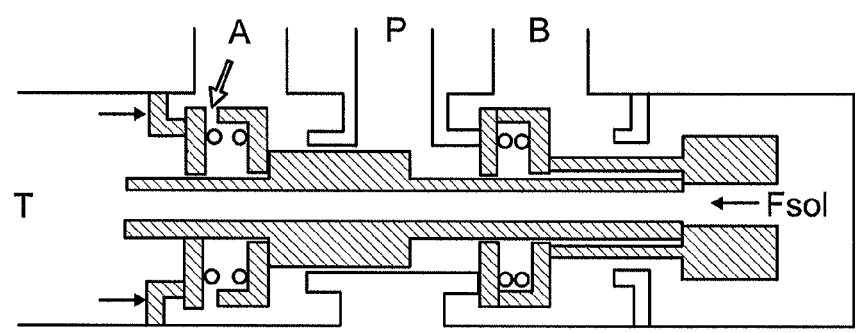
Figure 7E:
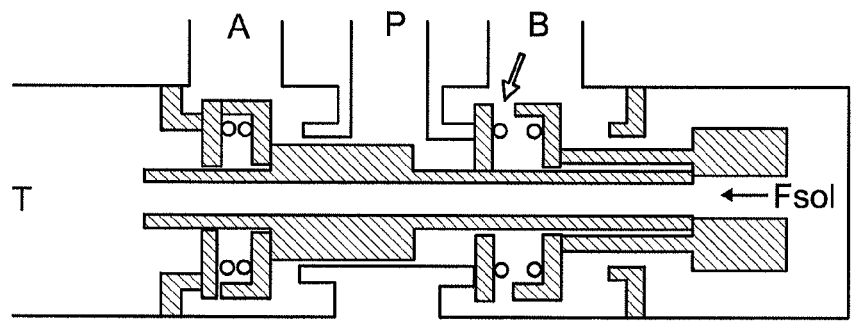

As shown in FIG. 7D, if the first seat 10 is too close to the second axial end 4 of the valve body 2, the first seat 10 is pressed in the axial direction with an assembly aid until the first disc 20 engages the first cup 22 and the first poppet 18 seals the first peripheral control port 6 from the axial end port 5. As shown in FIG. 7E, if the first seat 10 is too far away from the second axial end 4 of the valve body 2, the first seat 10 can be pressed in the opposite direction via the cylindrical pin 38 by energizing the solenoid assembly 48. Alternatively, an assembly aid can be used to apply force to the armature 50 to move the first seat 10 until leakage between the medial peripheral port 8 and the second peripheral control port 7 is minimized.

Having thus described various embodiments of the present control valve in detail, it is to be appreciated and will be apparent to those skilled in the art that many changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS

1 Control Valve
2 Valve Body
3 First Axial End of Valve Body
4 Second Axial End of Valve Body
5 Axial End Port
6 First Peripheral Control Port
7 Second Peripheral Control Port
8 Medial Peripheral Port
10 First Seat
12 Second Seat
14 Dual Seat
18 First Poppet
20 First Disc
22 First Cup
24 First Spring
28 Second Poppet
30 Second Disc
32 Second Cup
34 Second Spring
38 Cylindrical Pin
40 Enlarged Engagement Portion
42 Hollow Center
44 First End of Cylindrical Pin
46 Second End of Cylindrical Pin
48 Solenoid Assembly
50 Armature
52 Sleeve
54 Retainer
56 Return Spring
58 First End of Return Spring
60 Second End of Return Spring
62 Assembly Seal Aid
64 Engagement Tool

What is claimed is:

1. A control valve for hydraulic media, comprising:
a valve body defining an axial end port, a first peripheral control port, a second peripheral control port, and a medial peripheral port, a first seat positioned in the valve body between the axial end port and the first peripheral control port, a dual seat surrounding the medial peripheral port and positioned in the valve body between the first peripheral control port and the second peripheral control port, a second seat positioned in the valve body between the second peripheral control port and a first axial end of the valve body opposite the axial end port, a first poppet, including a first disc, a first cup, and a first spring located therebetween, positioned between the first seat and the dual seat, a second poppet, including a second disc, a second cup, and a second spring located therebetween, positioned between the dual seat and the second seat, a cylindrical pin with an enlarged engagement portion slidably supported within the valve body, a solenoid assembly including a sleeve and an armature movable in an axial direction with the armature contacting a first end of the cylindrical pin, a retainer and a return spring acting on a second end of the cylindrical pin, the first poppet being located on the cylindrical pin for independent sliding movement of the first disc and the first cup along the cylindrical in between the enlarged engagement portion and the retainer, and the second poppet being located on the cylindrical pin for independent sliding movement of the second disc and the second cup along the cylindrical pin between the enlarged engagement portion and the sleeve, wherein the first and second poppets are pressed closed and the first peripheral control port is in fluid connection with the axial end port and the medial peripheral port is in fluid connection with the second peripheral control port when the solenoid assembly is in a deactivated state, the armature presses the cylindrical pin against the retainer when the solenoid assembly is actuated in a first state such that the first peripheral control port is isolated from fluid connection by the first disc contacting the first seat and the first cup contacting the dual seat, and the second peripheral control port is isolated from fluid connection by the second disc contacting the dual seat and the second cup contacting the second seat, and the sleeve engages the second cup when the solenoid assembly is actuated in a second state, such that the second peripheral control port is in fluid connection with the axial end port, and the medial peripheral port is in fluid communication with the first peripheral control port.

2. The control valve of claim 1, wherein the dual seat is formed with the valve body.

3. The control valve of claim 1, wherein the cylindrical pin is hollow, and allows fluid connection between the second peripheral control port and the axial end port.

4. The control valve of claim 1, wherein the axial end port is a tank port and the medial peripheral port is a supply pressure port.

5. The control valve of claim 1, wherein the axial end port is a supply pressure port and the medial peripheral port is a tank port.

6. The control valve of claim 1, wherein the first spring biases the first disc against the retainer and the first seat and the first cup against the dual seat.

7. The control valve of claim 1, wherein the second spring biases the second disc against the dual seat and the second cup against the second seat.

8. A method for assembling a control valve for hydraulic media, comprising:

providing a valve body including a housing, an axial end port at a first axial end of the valve body, a first peripheral control port, a second peripheral control port, and a medial peripheral port, inserting a first seat into the valve body from a second axial end of the valve body past the first peripheral control port and fixing the first seat within the valve body, inserting a return spring, a retainer, a first poppet, and a dual seat from the second axial end of the valve body, such that a first end of the return spring engages the first axial end of the valve body and the retainer engages a second end of the return spring, the first poppet includes a first disc, a first cup, and a first spring located therebetween, fixing a dual seat in position in the valve body such that the dual seat surrounds the medial peripheral port, the first spring biases the first disc against the first seat and biases the first cup against the dual seat, inserting a cylindrical pin with an enlarged engagement portion, a second poppet, and a second seat from the second axial end of the valve body, the second poppet includes a second disc, a second cup, and a second spring located therebetween that biases the second disc against the dual seat and biases the second cup against the second seat, the cylindrical pin extends through the first and second poppets for independent sliding movement of the first disc and the first cup along the cylindrical pin and independent sliding movement of the second disc and the second cup along the cylindrical pin, and inserting a solenoid assembly from the second axial end of the valve body and closing the second axial end of the valve body to seal the valve body.

9. A method for calibrating a control valve for hydraulic media, comprising:

providing a valve body defining an axial end port, a first peripheral control port, a second peripheral control port, and a medial peripheral port, a first seat positioned in the valve body between the axial end port and the first peripheral control port, a dual seat surrounding the medial peripheral port and positioned in the valve body between the first peripheral control port and the second peripheral control port, a second seat positioned in the valve body between the second peripheral control port and an axial end of the valve body opposite the axial end port, a first poppet, including a first disc, a first cup, and a first spring located therebetween, positioned between the first seat and the dual seat, and a second poppet, including a second disc, a second cup, and a second spring located therebetween, positioned between the dual seat and the second seat, detecting leakage of hydraulic media between the axial end port, the first peripheral control port, the second peripheral control port, and the medial peripheral port based on the position of the first and second poppets, and adjusting the position of the first seat, the dual seat, or the second seat in the valve body based on the leakage.

* * * * *